US008794582B2

(12) United States Patent
Feng et al.

(10) Patent No.: US 8,794,582 B2
(45) Date of Patent: Aug. 5, 2014

(54) CARBON NANOTUBE FILM SUPPORTING STRUCTURE AND METHOD FOR USING SAME

(75) Inventors: Chen Feng, Beijing (CN); Yu-Quan Wang, Beijing (CN); Liang Liu, Beijing (CN); Li Qian, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 101 days.

(21) Appl. No.: 13/114,953

(22) Filed: May 24, 2011

(65) Prior Publication Data

US 2012/0104213 A1 May 3, 2012

(30) Foreign Application Priority Data

Oct. 27, 2010 (CN) .......................... 2010 1 0521687

(51) Int. Cl.
*C04B 38/00* (2006.01)
*H01J 37/20* (2006.01)
*C04B 111/00* (2006.01)

(52) U.S. Cl.
CPC .............................. *C04B 38/0074* (2013.01); *C04B 2111/00612* (2013.01)
USPC ..................................... 248/346.03; 248/694

(58) Field of Classification Search
CPC .......... C04B 38/00; B82Y 30/00; B32B 5/00; H01J 37/20
USPC ............. 248/346.01, 309.1, 310; 250/440.11; 977/742, 842; 156/185
See application file for complete search history.

(56) References Cited

U.S. PATENT DOCUMENTS

| 4,606,463 | A | 8/1986 | Stavis |
| 5,642,597 | A * | 7/1997 | Hendrickson .................... 52/715 |
| 6,278,231 | B1 * | 8/2001 | Iwasaki et al. ................. 313/310 |
| 7,459,839 | B2 * | 12/2008 | Tolt ................................ 313/310 |
| 7,494,103 | B1 * | 2/2009 | Huebner .................. 248/346.07 |
| 7,588,728 | B2 * | 9/2009 | Clark et al. .................... 422/552 |
| 8,241,081 | B2 * | 8/2012 | Hao et al. .......................... 445/24 |
| 2008/0237464 | A1 * | 10/2008 | Zhang et al. .................. 250/311 |
| 2008/0239489 | A1 | 10/2008 | Feng et al. |
| 2008/0248235 | A1 | 10/2008 | Feng et al. |
| 2009/0159328 | A1 | 6/2009 | Dai et al. |
| 2009/0167707 | A1 * | 7/2009 | Jiang et al. ..................... 345/173 |
| 2009/0317926 | A1 * | 12/2009 | Zhang et al. ..................... 438/20 |
| 2010/0181482 | A1 * | 7/2010 | Zhang et al. .................. 250/311 |
| 2011/0019273 | A1 * | 1/2011 | Feng et al. ..................... 359/485 |
| 2011/0027486 | A1 * | 2/2011 | Jiang et al. .................... 427/331 |

(Continued)

FOREIGN PATENT DOCUMENTS

| TW | 200621498 | 7/2006 |
| TW | M302042 | 12/2006 |
| TW | 200841052 | 10/2008 |
| TW | 200929725 | 7/2009 |

*Primary Examiner* — Terrell McKinnon
*Assistant Examiner* — Eret McNichols
(74) *Attorney, Agent, or Firm* — Novak Druce Connolly Bove + Quigg LLP

(57) ABSTRACT

A carbon nanotube film supporting structure is provided. The carbon nanotube film supporting structure is used for supporting a carbon nanotube film structure. The carbon nanotube film supporting structure includes a body and a number of voids. The body has a surface defining a support region. The voids are defined in the support region. A void ratio of the support region is greater than or equal to 80%. The present disclosure also provides a method for using the carbon nanotube film supporting structure.

13 Claims, 9 Drawing Sheets

(56) References Cited

U.S. PATENT DOCUMENTS

2011/0192988 A1* 8/2011 Feng et al. ............... 250/440.11
2011/0237148 A1* 9/2011 Hao et al. ...................... 445/23
2011/0252619 A1* 10/2011 Qian et al. ...................... 29/428
2011/0253669 A1* 10/2011 Liu et al. .......................... 216/36
2011/0253908 A1* 10/2011 Feng et al. .................. 250/491.1
2013/0146214 A1* 6/2013 Qian et al. ..................... 156/185

* cited by examiner providing a carbon nanotube film structure and a carbon nanotube film supporting structure, the carbon nanotube film supporting structure includes a body, the body having a surface defining a support region, a plurality of voids defined by the support region, a ratio of a plurality of voids area to a support region area, as defined by a contour of the support region, is greater than or equal to 80%

placing the carbon nanotube film structure on the support region of the carbon nanotube film supporting structure

FIG. 3

CARBON NANOTUBE FILM SUPPORTING STRUCTURE AND METHOD FOR USING SAME

CROSS-REFERENCE TO RELATED APPLICATIONS

This application claims all benefits accruing under 35 U.S.C. §119 from China Patent Application No. 201010521687.5, filed on Oct. 27, 2010 in the China Intellectual Property Office, the disclosure of which is incorporated herein by reference. This application is related to applications entitled, "CARBON NANOTUBES FILM SUPPORTING STRUCTURE AND METHOD FOR USING THE SAME", filed May 24, 2011 Ser. No. 13/114,947.

BACKGROUND

1. Technical Field

The present disclosure relates to a carbon nanotube film supporting structure and a method for using the carbon nanotube film supporting structure.

2. Description of Related Art

Carbon nanotubes are tubules of carbon generally having diameters ranging from 0.5 nanometers to 100 nanometers. Carbon nanotubes have recently attracted a great deal of attention for use in different applications such as field emitters, gas storage and separation, chemical sensors, and high strength composites, because of their thermal, electrical, and mechanical properties.

However, because carbon nanotubes are microscopic structures, it is necessary to assemble the carbon nanotubes at a macroscopic level. Moreover, carbon nanotube film is only one kind of macroscopic structure of carbon nanotubes.

Recently, as disclosed by the pre-grant publication US20080248235 to Feng et al., a free-standing carbon nanotube film has been fabricated. The carbon nanotube film can be used in many different fields. For example, the carbon nanotube film can be used as a transparent conductive film in a touch panel or a liquid display, which can be flexible.

However, this kind of carbon nanotube film is very thin. In the carbon nanotube film, the adjacent carbon nanotubes are combined and attracted by the van der Waals force, which is relatively weak. An external mechanical force applied on the carbon nanotube film may easily damage or destroy the film. Furthermore, the carbon nanotube film has an extremely large specific surface area, which makes the carbon nanotubes adhesive and difficult to handle, particularly if a large amount of carbon nanotube films are fabricated.

What is needed, therefore, is to provide a carbon nanotube film supporting structure and a method for using the carbon nanotube film supporting structure, which can overcome the above-described shortcomings.

BRIEF DESCRIPTION OF THE DRAWINGS

Many aspects of the embodiments can be better understood with reference to the following drawings. The components in the drawings are not necessarily to scale, the emphasis instead being placed upon clearly illustrating the principles of the present disclosure. Moreover, in the drawings, like reference numerals designate corresponding parts throughout the several views.

FIG. 3 shows a flow chart of a embodiment of using the carbon nanotube film supporting structure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
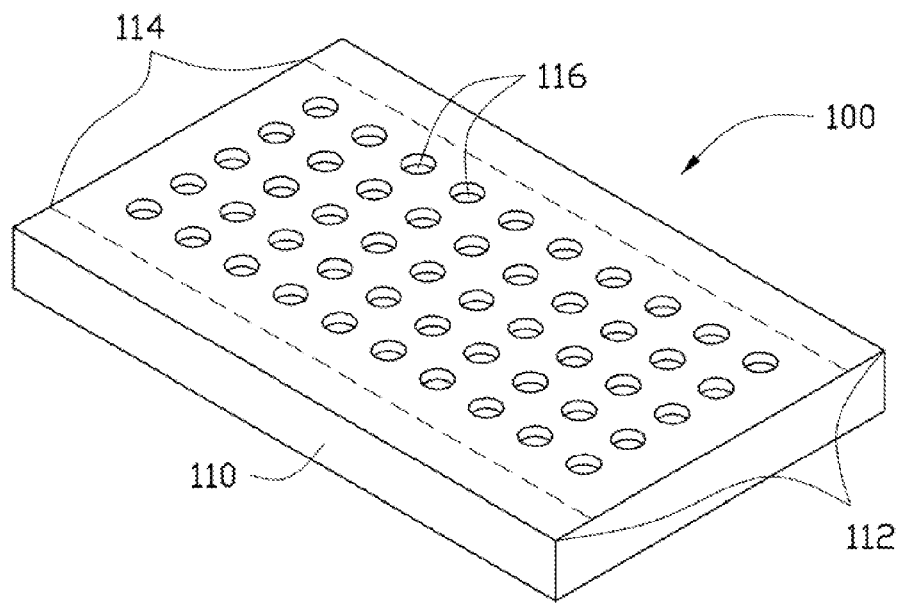
FIG. 1 shows a schematic structural view of one embodiment of a carbon nanotube film supporting structure.

Referring to FIG. 1, a carbon nanotube film supporting structure 100 is provided. The carbon nanotube film supporting structure 100 can be used for supporting or protecting a carbon nanotube film structure. The carbon nanotube film structure can be peeled off completely from the carbon nanotube film supporting structure 100. The carbon nanotube film supporting structure 100 includes a body 110 having a surface 112. A support region 114 is one part of the surface 112. A number of micropores 116 are, uniformly or not, defined in the support region 114.

A ratio of a plurality of micropores area to a support region area, as defined by a contour of the support region 114, is greater than or equal to 80%. That is to say, an area summation of the cross section of the micropores 116 can be greater than or equal to 80% of the support region area. When the carbon nanotube film structure is placed on the support region 114, the effective contact area between the carbon nanotube film structure and the support region 114 can be less than or equal to 20% of the total area of the carbon nanotube film structure. Therefore, the carbon nanotube film structure can be peeled off completely after being in contact with the carbon nanotube film supporting structure 100. In other embodiments, the ratio of the plurality of voids area to the support region area, as defined by the contour of the support region 114, is greater than or equal to 90%. The effective contact area between the carbon nanotube film structure and the support region 114 can be less than or equal to 10% of the total area of the carbon nanotube film structure.

The body 110 can be a sheet structure having certain mechanical strength. A material of the body 110 can be metal, metal oxide, ceramics, or resin. Shape and size of body 110 are not limited.

The surface 112 of the body 110 can be a flat surface, a curved surface, or irregular surfaces. The support region area can be equal to or less than an area of the surface 112. The micropores 116, distributed in the support region 114, can be apart from each other. The micropores 116 can be defined on the surface 112 of the body 110 by chemical method or physical method. The micropores 116 can be through holes or blind holes. A shape of the cross section of the micropores 116 can be round, square, rectangular, oval, or other shapes.

The micropores 116 can be distributed uniformly on the surface 112 of body 110. A diameter of the micropores 116 can be in a range from about 100 micrometers to about 1000 micrometers. A distance between adjacent micropores 116 can be in a range from about 10 micrometers to about 100 micrometers. A depth of the micropores 116 can be in a range from about 1 micrometer to about 1000 micrometers. In some embodiments, the micropores 116 are distributed unevenly in the support region 114.

Alternatively, the size and the distribution conditions of the micropores 116 can be changed according in different embodiments. As long as the ratio of diameter of the micropores 116 and a distance between adjacent micropores 116 is greater than or equal to 5:1, and the distance between adjacent micropores 116 is less than or equal to about 100 micrometers. In other embodiments, the ratio of diameter of the micropores 116 and distance between adjacent micropores 116 is greater than or equal to 10:1, and the distance between adjacent micropores 116 is less than or equal to about 100 micrometers.

In one embodiment, the body 110 is an anodic aluminum oxide film. The anodic aluminum oxide film can be made by an anode oxidation method. The anodic aluminum oxide film defines a number of the micropores distributed uniformly on the surface. A diameter of the micropores on the surface of anodic aluminum oxide film is about 500 micrometers. A distance between adjacent micropores is about 50 micrometers.

Figure 2:
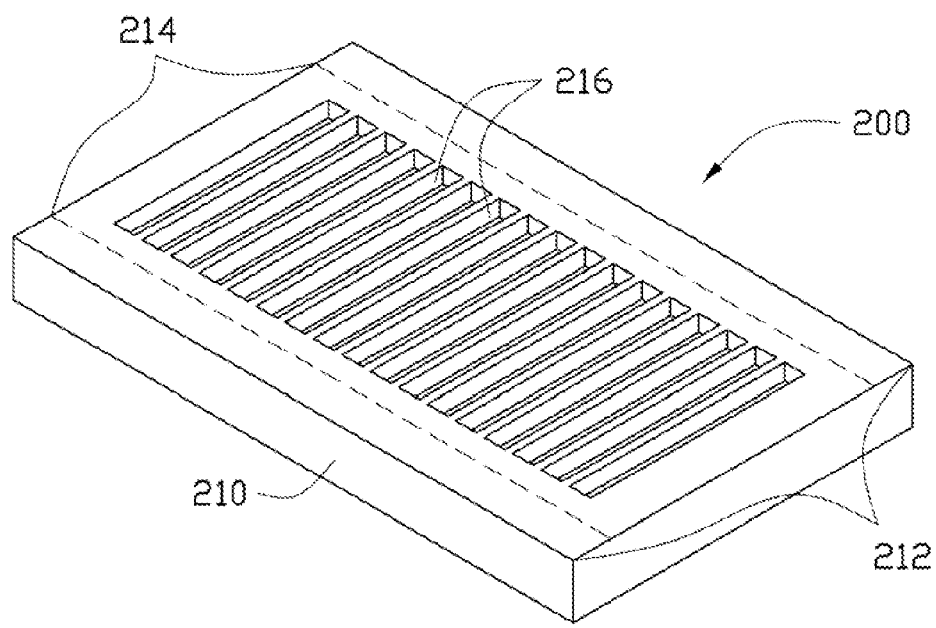
FIG. 2 shows a schematic structural view of another embodiment of a carbon nanotube film supporting structure.

Referring to FIG. 2, a carbon nanotube film supporting structure 200, according to another embodiment, is disclosed. The carbon nanotube film supporting structure 200 includes a body 210 having a surface 212. A support region 214 is one part of the surface 212. A number of grooves 216 are uniformly defined in the support region 214.

A ratio of a plurality of grooves area to a support region area, as defined by a contour of the support region 214, is greater than or equal to 80%. That is to say, an area summation of the cross section of the grooves 216 can be greater than or equal to 80% of the support region area. When the carbon nanotube film structure is placed on the support region 214, the effective contact area between the carbon nanotube film structure and the support region 214 can be less than or equal to 20% of the total area of the carbon nanotube film structure. Therefore, the carbon nanotube film structure can be peeled off completely after being in contact with carbon nanotube film supporting structure 200. In other embodiments, the ratio of the plurality of grooves area to the support region area, as defined by the contour of the support region 214, is greater than or equal to 90%. The effective contact area between the carbon nanotube film structure and the support region 214 can be less than or equal to 10% of the total area of the carbon nanotube film structure.

The support region area can be equal to or less than an area of the surface 212. The grooves 216, distributed in the support region 214, can be apart from each other. The grooves 216 can be defined on the surface 212 of the body 210 by chemical method or physical method. A shape of grooves 216 can linear or other shapes.

The grooves 216 parallel to each other can be distributed uniformly on the partial surface 212 of the body 210. A width of the grooves 216 can be in a range from about 100 micrometers to about 1000 micrometers. A distance between adjacent grooves 216 can be in a range from about 10 micrometers to about 100 micrometers. A depth of the grooves 216 can be in a range from about 1 micrometer to about 1000 micrometers.

Alternatively, size and distribution conditions of the grooves 216 can be changed according to different embodiments. In many embodiments, the ratio of a width of the grooves 216 and a distance between adjacent grooves 216 is greater than or equal to 5:1, and the distance between adjacent grooves 216 is less than or equal to about 100 micrometers. In other embodiments, the ratio of the width of the grooves 216 and the distance between two adjacent grooves 216 is greater than or equal to 10:1, and the distance between two adjacent grooves 216 is less than or equal to about 100 micrometers.

In one embodiment, the grooves in the ceramics film are parallel to each other. A width of the grooves is about 500 micrometers. A distance between adjacent grooves is about 50 micrometers.

Other characteristics of the carbon nanotube supporting structure 200 are the same as the carbon nanotube supporting structure 100 disclosed above.

The carbon nanotube film supporting structure disclosed in the present disclosure has characteristics of simple structure and low cost. Furthermore, by simply fixing a number of voids (e.g., micropores, grooves, or the combination of micropores and grooves) on the surface of the carbon nanotube film supporting structure, the carbon nanotube film supporting structure can be used to support and/or protect carbon nanotube film structures. In addition, the carbon nanotube film structures can be separated from the carbon nanotube film supporting structure without damage.

Referring to FIG. 3, an embodiment of a method for using the carbon nanotube film supporting structure is also provided. The method includes the following steps:

(S1) providing a carbon nanotube film structure and a carbon nanotube film supporting structure, the carbon nanotube film supporting structure includes a body, the body having a surface defining a support region, a plurality of voids defined by the support region, a ratio of a plurality of voids area to a support region area, as defined by a contour of the support region, is greater than or equal to 80%; and (S2) placing the carbon nanotube film structure on the support region of the carbon nanotube film supporting structure.

In step (S1), the body can be a sheet structure having certain mechanical strength. A material of the body can be metal, metal oxide, ceramics, or resin. The surface of the body can be a flat surface, a curved surface, or irregular surfaces. The support region area can be equal to or less than an area of the surface.

The voids can be distributed uniformly in the support region. The voids can be micropores, grooves, or the combination of micropores and grooves. The voids can be defined on the surface of the body by chemical method or physical method.

The micropores can be through holes or blind holes. A shape of the cross section of the micropores can be round, square, rectangular, oval, or non-geometric shapes. A diameter of the micropores can be in a range from about 100 micrometers to about 1000 micrometers. A distance between adjacent micropores can be in a range from about 10 micrometers to about 100 micrometers. The blind holes have certain depth. The depth of the blind holes can be in a range from about 1 micrometer to about 1000 micrometers.

A shape of grooves can be strip or other shapes. The grooves can be parallel to each other. A width of the grooves can be in a range from about 100 micrometers to about 1000 micrometers. A distance between adjacent grooves can be in a range from about 10 micrometers to about 100 micrometers.

A depth of the grooves can be in a range from about 1 micrometer to about 1000 micrometers.

The carbon nanotube film structure includes at least one carbon nanotube film.

Figure 4:
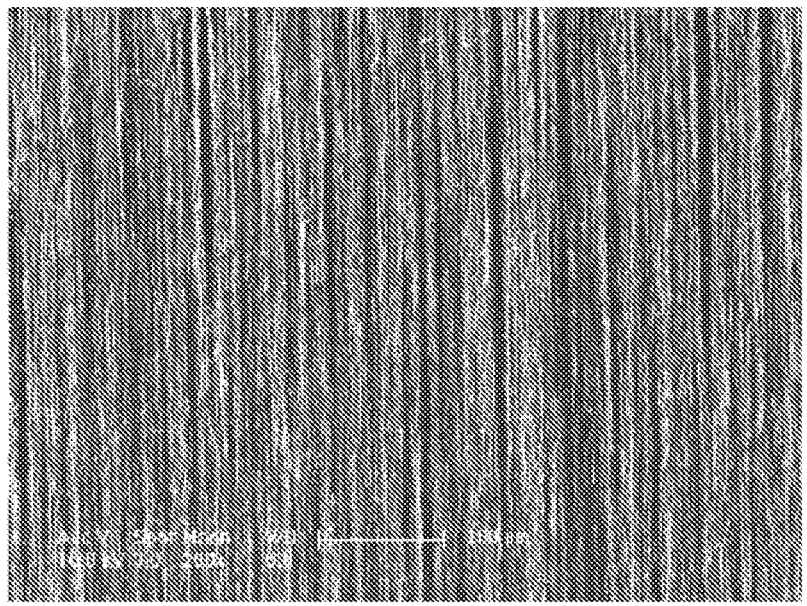
FIG. 4 is a Scanning Electron Microscope (SEM) image of a drawn carbon nanotube film.

Referring to FIG. 4, the carbon nanotube film can be a drawn carbon nanotube film formed by drawing a film from a carbon nanotube array. Examples of the drawn carbon nanotube film are taught by U.S. Pat. No. 7,045,108 to Jiang et al. The thickness of the drawn carbon nanotube film can be in a range from about 0.5 nm to about 100 micrometers.

The drawn carbon nanotube film includes a number of carbon nanotubes that are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals force, to form a free-standing film. The term 'free-standing' includes films that do not have to be supported by a substrate. A small number of the carbon nanotubes are randomly arranged in the drawn carbon nanotube film, and has a small if not negligible effect on the larger number of the carbon nanotubes in the drawn carbon nanotube film arranged substantially along the same direction. It can be appreciated that some variation can occur in the orientation of the carbon nanotubes in the drawn carbon nanotube film. Microscopically, the carbon nanotubes oriented substantially along the same direction may not be perfectly aligned in a straight line, and some curve portions may exist. It can be understood that contact between some carbon nanotubes located substantially side by side and oriented along the same direction cannot be totally excluded.

More specifically, the drawn carbon nanotube film can include a number of successively oriented carbon nanotube segments joined end-to-end by van der Waals force therebetween. Each carbon nanotube segment includes a number of carbon nanotubes substantially parallel to each other, and joined by van der Waals force therebetween. The carbon nanotube segments can vary in width, thickness, uniformity and shape. The carbon nanotubes in the drawn carbon nanotube film are also substantially oriented along a preferred orientation. The width of the drawn carbon nanotube film relates to the carbon nanotube array from which the drawn carbon nanotube film is drawn.

The carbon nanotube film structure can include more than one drawn carbon nanotube film. An angle can exist between the orientation of carbon nanotubes in adjacent films, stacked and/or coplanar. Adjacent carbon nanotube films can be combined by only the van der Waals force therebetween without the need of an additional adhesive. An angle between the aligned directions of the carbon nanotubes in two adjacent drawn carbon nanotube films can range from about 0 degrees to about 90 degrees. Spaces are defined between two adjacent carbon nanotubes in the drawn carbon nanotube film. When the angle between the aligned directions of the carbon nanotubes in adjacent drawn carbon nanotube films is larger than 0 degrees.

Figure 5:
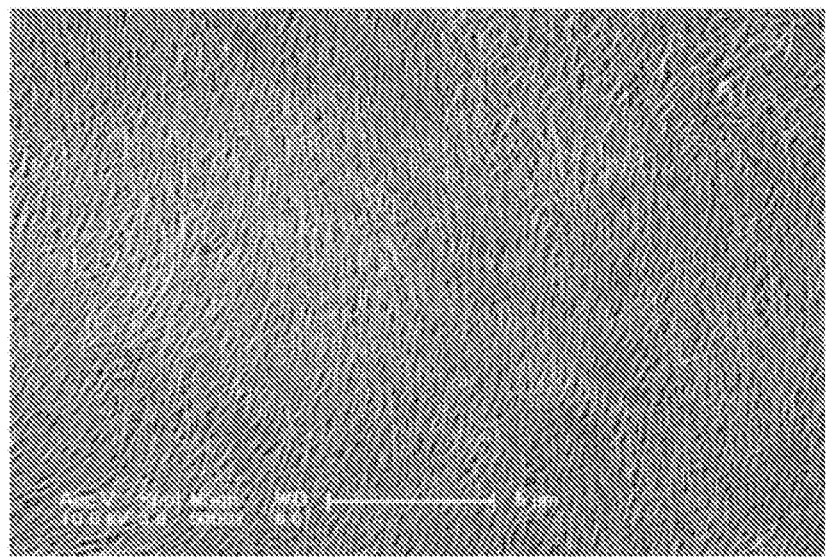
FIG. 5 is a SEM image of a pressed carbon nanotube film.

Referring to FIG. 5, the carbon nanotube film can also be a pressed carbon nanotube film formed by pressing a carbon nanotube array down on the substrate. The carbon nanotubes in the pressed carbon nanotube array are arranged along a same direction or along different directions. The carbon nanotubes in the pressed carbon nanotube array can rest upon each other. Adjacent carbon nanotubes are attracted to each other and combined by van der Waals force. An angle between a primary alignment direction of the carbon nanotubes and a surface of the pressed carbon nanotube array is about 0 degrees to approximately 15 degrees. The greater the pressure applied, the smaller the angle obtained. When the carbon nanotubes in the pressed carbon nanotube array are arranged along different directions, the carbon nanotube structure can be isotropic. The thickness of the pressed carbon nanotube array can range from about 0.5 nm to about 1 millimeter. The length of the carbon nanotubes can be larger than 50 micrometers. Examples of the pressed carbon nanotube film are taught by US PGPub. 20080299031 A1 to Liu et al.

Figure 6:
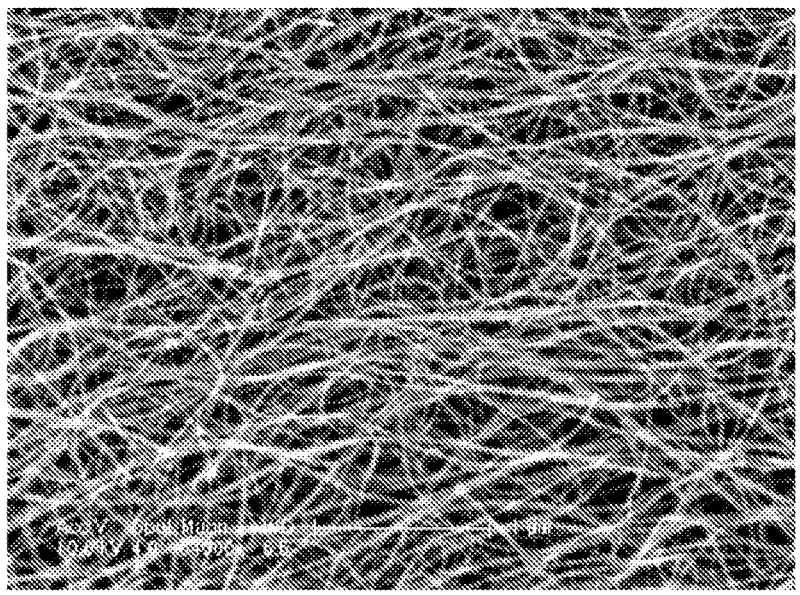
FIG. 6 is a SEM image of a flocculated carbon nanotube film.

Referring to FIG. 6, the carbon nanotube film can also be a flocculated carbon nanotube film formed by a flocculating method. The flocculated carbon nanotube film can include a number of long, curved, disordered carbon nanotubes entangled with each other. A length of the carbon nanotubes can be greater than 10 centimeters. In one embodiment, the length of the carbon nanotubes is in a range from about 200 microns to about 900 micrometers. Further, the flocculated carbon nanotube film can be isotropic. Here, "isotropic" means the carbon nanotube film has properties identical in all directions substantially parallel to a surface of the carbon nanotube film. The carbon nanotubes can be substantially uniformly distributed in the carbon nanotube film. The adjacent carbon nanotubes are acted upon by the van der Waals force therebetween. The thickness of the flocculated carbon nanotube film can range from about 1 micrometers to about 1 millimeter.

In one embodiment, the carbon nanotube film structure is a drawn carbon nanotube film. A method for making the drawn carbon nanotube film can include the sub-steps of: (S11) providing a carbon nanotube array capable of having a film drawn therefrom; and (S12) pulling/drawing out a drawn carbon nanotube film from the carbon nanotube array. The pulling/drawing can be done by using a tool (e.g., adhesive tape, pliers, tweezers, or another tool allowing multiple carbon nanotubes to be gripped and pulled simultaneously).

In step (S11), the given carbon nanotube array can be formed by a chemical vapor deposition (CVD) method. The carbon nanotube array includes a number of carbon nanotubes parallel to each other and approximately perpendicular to the substrate. The carbon nanotubes in the carbon nanotube array are closely packed together by van der Waals force. The carbon nanotubes in the carbon nanotube array can be single-walled carbon nanotubes, double-walled carbon nanotubes, multi-walled carbon nanotubes, or combinations thereof. The diameter of the carbon nanotubes can be in a range from about 0.5 nanometers to about 50 nanometers. The height of the carbon nanotubes can be in a range from about 50 nanometers to 5 millimeters. In one embodiment, the height of the carbon nanotubes can be in a range from about 100 microns to 900 microns.

In step (S12), the drawn carbon nanotube film includes a number of carbon nanotubes, and there are interspaces between adjacent two carbon nanotubes. Carbon nanotubes in the drawn carbon nanotube film can be substantially parallel to a surface of the drawn carbon nanotube film. A distance between adjacent two carbon nanotubes can be larger than a diameter of the carbon nanotubes. The drawn carbon nanotube film can be pulled/drawn by the following sub-steps: (S121) selecting a carbon nanotube segment having a predetermined width from the carbon nanotube array; and (S122) pulling the carbon nanotube segment at an even/uniform speed to achieve a uniform drawn carbon nanotube film.

In step (S121), the carbon nanotube segment having a predetermined width can be selected by using an adhesive tape such as the tool to contact the carbon nanotube array. The carbon nanotube segment includes a number of carbon nanotubes parallel to each other. In step (S122), the pulling direction is arbitrary (e.g., substantially perpendicular to the growing direction of the carbon nanotube array).

More specifically, during the pulling process, as the initial carbon nanotube segment is drawn out, other carbon nanotube segments are also drawn out end-to-end due to the van der Waals force between ends of adjacent segments. This process of drawing ensures that a continuous, uniform carbon nanotube film having a predetermined width can be formed. The drawn carbon nanotube film has an extremely large specific surface area, and so is very sticky and difficult to handle, particularly when a large amount of carbon nanotube films are fabricated.

Figure 7:
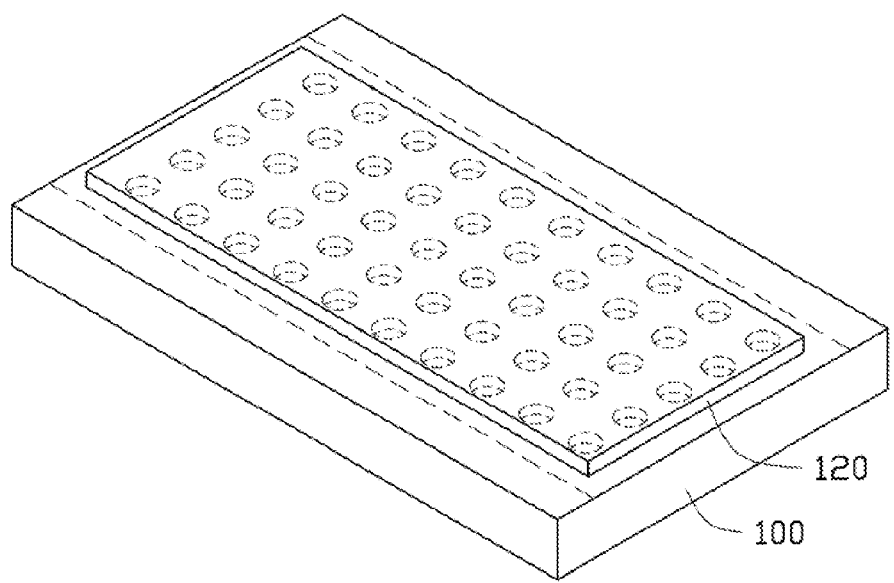
FIG. 7 shows a schematic structural view of a carbon nanotube film structure located on a support region of the carbon nanotube film supporting structure of FIG. 1 according to one embodiment.

In step (S2), in one embodiment to FIG. 7, the carbon nanotube film structure 120 is placed on the support region 114, the carbon nanotube film structure 120 covers all of the micropores 116, and is suspended on the micropores 116. Because the effective contact area between the carbon nanotube film structure 120 and the support region 114 is less than or equal to 20% of the total area of the carbon nanotube film structure 120. The van der Waals force between the carbon nanotube film structure 120 and the support region 114 is small. The van der Waals force between the carbon nanotube film structure 120 and the carbon nanotube film supporting structure 100 is lower than the van der Waals force between the adjacent carbon nanotubes in the carbon nanotube film structure 120. The carbon nanotube film structure 120 can be peeled off easily from the carbon nanotube film supporting structure 100 without damaging the carbon nanotube film structure 120. The carbon nanotube film structure 120 is protected by the carbon nanotube film supporting structure 100 when the carbon nanotube film structure 120 is transferred from the carbon nanotube film supporting structure 100.

In the step (S2), if the carbon nanotube film structure 120 includes a number of carbon nanotube films, the carbon nanotube films can be applied on the support region 114 successively. The carbon nanotube film in the carbon nanotube film structure can be overlapped with each other or located apart from each other.

Figure 8:
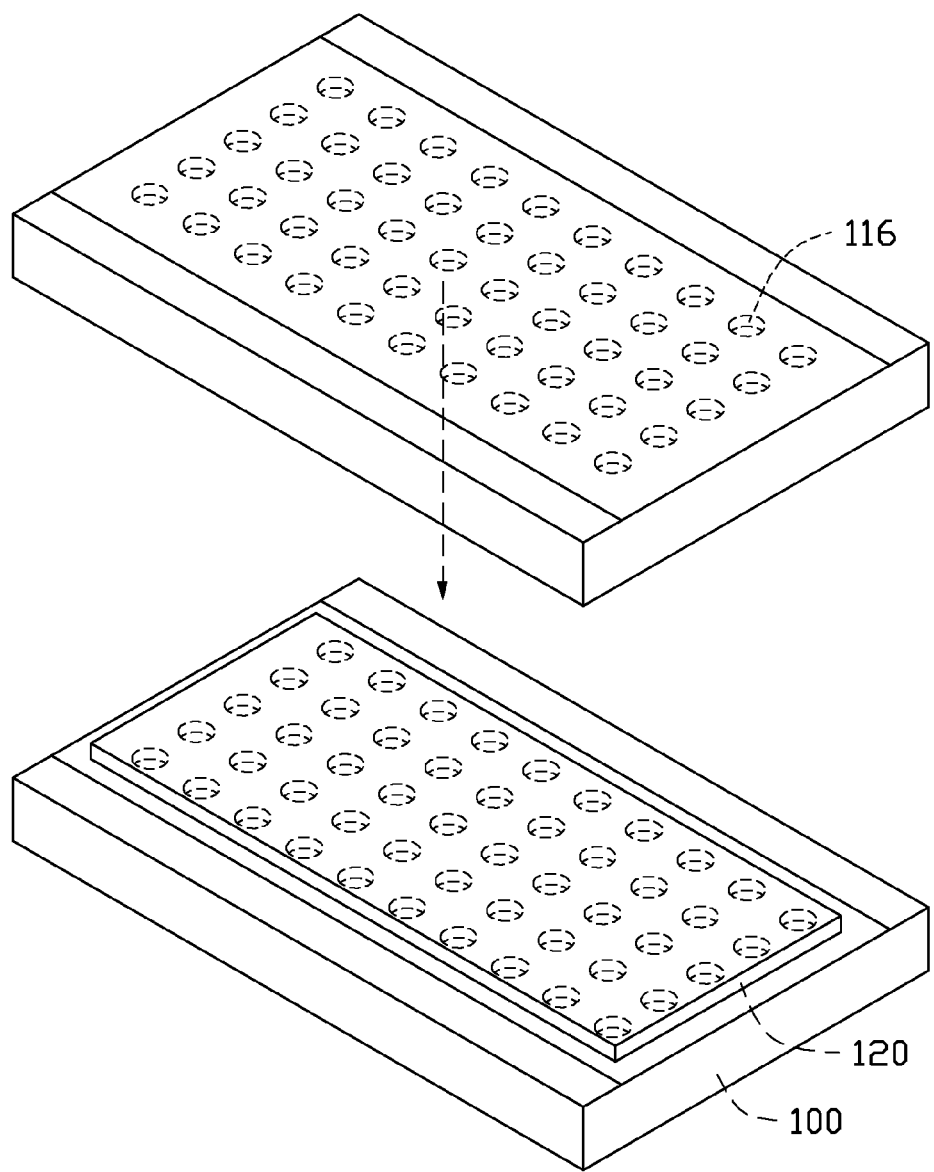
FIG. 8 shows a schematic structural view of applying another carbon nanotube film structure to cover the carbon nanotube film structure of FIG. 7 according to one embodiment.
Figure 9:
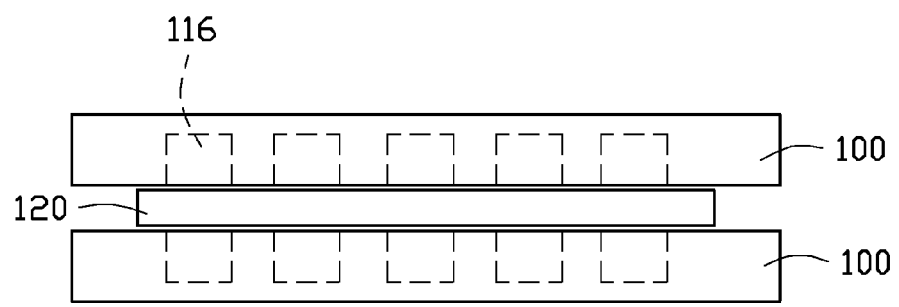
FIG. 9 shows a lateral view of a carbon nanotube film structure located by the support region between two carbon nanotube film supporting structures according to one embodiment.

Referring to FIG. 8 and FIG. 9, in another embodiment, after the step (S2), a step (S3) of applying another carbon nanotube film supporting structure 100 on a surface of the carbon nanotube film structure 120 can be further provided. In the step (S3), the carbon nanotube film structure 120 is located between the two carbon nanotube film supporting structures to form a layered structure. When the layered structure is formed, the carbon nanotube film structure 120 is secured and protected by the support regions 114 between the two carbon nanotube film supporting structures 100. The structure of the two carbon nanotube film supporting structures 100 can be the same.

The method for using the carbon nanotube film supporting structure has at least the following advantages. First, it is very convenient to support or protect the carbon nanotube film structure by placing the carbon nanotube film structure on the carbon nanotube film supporting structure. Second, if the carbon nanotube film structure is secured by the two carbon nanotube film supporting structures, the carbon nanotube film structure can be firmly fixed. Furthermore, the layered structure can prevent the carbon nanotube film structure from the external destruction and dust.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. A carbon nanotube film supporting structure comprising:
    a body having a surface, the surface defining a support region;
    a plurality of micropores defined by the support region; and
    a carbon nanotube film structure located on the support region;
    wherein a ratio of a plurality of micropores area to a support region area, as defined by a contour of the support region, is greater than or equal to 80%, a diameter of plurality of micropores is in a range from about 100 micrometers to about 1000 micrometers, and a distance between adjacent micropores is in a range from about 10 micrometers to about 100 micrometers, and a ratio of a diameter of the plurality of micropores and a distance between adjacent micropores is greater than or equal to 5:1.

2. The carbon nanotube film supporting structure of claim 1, wherein the ratio of the plurality of micropores area to the support region area, as defined by the contour of the support region, is greater than or equal to 90%.

3. The carbon nanotube film supporting structure of claim 1, wherein the surface of the body is flat.

4. The carbon nanotube film supporting structure of claim 1, wherein the plurality of micropores is distributed uniformly in the support region.

5. The carbon nanotube film supporting structure of claim 1, wherein the ratio of a diameter of the plurality of micropores and a distance between adjacent micropores is greater than or equal to 10:1.

6. The carbon nanotube film supporting structure of claim 1, wherein materials of the body is metal, metal oxide, ceramics, resin or combination thereof.

7. The carbon nanotube film supporting structure of claim 1, wherein the body is an anodic aluminum oxide defining a plurality of micropores.

8. A method, the method comprising:
    (a) providing a carbon nanotube film structure and the carbon nanotube film supporting structure, the carbon nanotube film supporting structure comprises a body, the body having a surface defining a support region, a plurality of micropores defined by the support region, wherein a ratio of a plurality of micropores area to a support region area, as defined by a contour of the support region, is greater than or equal to 80%, a diameter of plurality of micropores is in a range from about 100 micrometers to about 1000 micrometers, and a distance between adjacent micropores is in a range from about 10 micrometers to about 100 micrometers, and a ratio of a diameter of the plurality of micropores and a distance between adjacent micropores is greater than or equal to 5:1; and (b) placing the carbon nanotube film structure on the support region of the carbon nanotube film supporting structure.

9. The method of claim 8, wherein the carbon nanotube film structure is suspended on the plurality of micropores.

10. The method of claim 8, wherein the carbon nanotube film structure comprises at least one carbon nanotube film, the at least one carbon nanotube film comprises a plurality of carbon nanotubes, and each carbon nanotube is joined to an adjacent carbon nanotube arranged substantially along the same direction, by van der Waals force.

11. The method of claim 10, wherein the at least one carbon nanotube film is a free-standing film.

12. The method of claim 10, wherein the at least one carbon nanotube film is drawn from a carbon nanotube array.

13. The method of claim 8, further comprising applying a second carbon nanotube film supporting structure on a surface of the carbon nanotube film structure.

\* \* \* \* \*